US011336692B1

(12) United States Patent
McCorkendale

(10) Patent No.: US 11,336,692 B1
(45) Date of Patent: May 17, 2022

(54) EMPLOYING SNI HOSTNAME EXTRACTION TO POPULATE A REVERSE DNS LISTING TO PROTECT AGAINST POTENTIALLY MALICIOUS DOMAINS

(71) Applicant: NortonLifeLock Inc., Tempe, AZ (US)

(72) Inventor: Bruce McCorkendale, Manhattan Beach, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 12 days.

(21) Appl. No.: 16/869,557

(22) Filed: May 7, 2020

(51) Int. Cl.
*H04L 65/00* (2022.01)
*H04L 29/06* (2006.01)
*H04L 61/4511* (2022.01)
*H04L 61/5007* (2022.01)
*H04L 69/16* (2022.01)
*H04L 67/568* (2022.01)

(52) U.S. Cl.
CPC ........ *H04L 63/166* (2013.01); *H04L 61/1511* (2013.01); *H04L 61/2007* (2013.01); *H04L 63/0236* (2013.01); *H04L 63/1416* (2013.01); *H04L 63/1441* (2013.01); *H04L 67/2842* (2013.01); *H04L 69/16* (2013.01)

(58) Field of Classification Search
CPC .............. H04L 63/166; H04L 63/1441; H04L 61/2007; H04L 63/1416; H04L 67/2842; H04L 61/1511; H04L 63/0236; H04L 69/16
See application file for complete search history.

(56) References Cited

U.S. PATENT DOCUMENTS

| 8,738,902 | B2 * | 5/2014 | Yoo ..................... H04L 63/0823 713/156 |
| 10,291,651 | B1 * | 5/2019 | Chaubey ................. H04L 63/20 |
| 10,594,658 | B1 * | 3/2020 | Vixie ...................... H04L 63/20 |
| 10,708,228 | B2 * | 7/2020 | Austin .................. H04L 63/101 |
| 10,924,503 | B1 * | 2/2021 | Pereira ............... H04L 63/0236 |

(Continued)

OTHER PUBLICATIONS

Dierks, Tim, and Eric Rescorla. "The transport layer security (TLS) protocol version 1.2." (2008): 5246. https://datatracker.ietf.org/doc/html/rfc5246.*

(Continued)

*Primary Examiner* — Jimmy H Tran
(74) *Attorney, Agent, or Firm* — Maschoff Brennan

(57) ABSTRACT

Server Name Indication (SNI) hostname extraction to populate a reverse Domain Name System (DNS) listing to protect against potentially malicious domains. In some embodiments, a method may include detecting a Transport Layer Security (TLS) handshake between a first client application and a first server application, extracting an SNI hostname and an Internet Protocol (IP) address from the TLS handshake, populating the reverse DNS listing with the SNI hostname as a domain paired with the IP address, detecting communication between a second client application and the IP address, accessing the reverse DNS listing to determine the domain paired with the IP address, determining that the domain is a potentially malicious domain, and in response to determining that the domain is a potentially malicious domain, performing a remedial action to protect against the potentially malicious domain.

17 Claims, 5 Drawing Sheets

(56) References Cited

U.S. PATENT DOCUMENTS

| | | | |
|---|---|---|---|
| 10,931,695 B2* | 2/2021 | Plonka | H04L 63/1425 |
| 11,050,715 B2* | 6/2021 | Austin | H04L 63/0263 |
| 2012/0303808 A1* | 11/2012 | Xie | H04L 63/101 |
| | | | 709/225 |
| 2013/0198511 A1* | 8/2013 | Yoo | H04L 63/0823 |
| | | | 713/156 |
| 2016/0156640 A1* | 6/2016 | Hart | H04L 63/14 |
| | | | 726/23 |
| 2016/0191548 A1* | 6/2016 | Smith | G06F 21/565 |
| | | | 726/23 |
| 2016/0352772 A1* | 12/2016 | O'Connor | H04L 63/1483 |
| 2017/0272470 A1* | 9/2017 | Gundamaraju | H04W 4/24 |
| 2018/0041521 A1* | 2/2018 | Zhang | H04L 63/14 |
| 2018/0115582 A1* | 4/2018 | Thakar | H04L 63/1466 |
| 2018/0241775 A1* | 8/2018 | Vera-Schockner | |
| | | | H04L 63/0823 |
| 2018/0351974 A1* | 12/2018 | Baughman | H04L 63/029 |
| 2019/0068554 A1* | 2/2019 | Austin | H04L 63/101 |
| 2019/0095512 A1* | 3/2019 | Mahjoub | G06F 16/285 |
| 2019/0130036 A1* | 5/2019 | Al-Kabra | G06F 16/9566 |
| 2019/0306188 A1* | 10/2019 | Medvedovsky | H04L 63/1425 |
| 2019/0387022 A1* | 12/2019 | Bagarolo | H04L 63/1483 |
| 2020/0067954 A1* | 2/2020 | Plonka | H04L 63/0281 |
| 2021/0067493 A1* | 3/2021 | Vixie | H04L 63/0428 |

OTHER PUBLICATIONS

D. Eastlake; "Transport Layer Security (TLS) Extensions: Extension Definitions"; Internet Engineering Task Force white paper; ISSN: 2070-1721; https://tools.ietf.org/html/rfc6066#page-6; Jan. 2011; 26 pages.

Wikipedia; "Server Name Indication"; webpage; located at https://en.wikipedia.org/wiki/Server_Name_Indication; accessed on May 7, 2020; 5 pages.

Cloudfare; "Whats SNI? How TLS Server Name Indication Works"; webpage; located at: https://www.cloudflare.com/learning/ssl/what-is-sni/; accessed on May 7, 2020; 2 pages.

* cited by examiner

Reverse DNS Listing — 200

| IP Address | Domain |
|---|---|
| 192.135.179.123 | goodsite.com |
| 157.15.27.197 | badsite.com |
| 105.37.51.93 | neutralsite.com |
| ... | ... |

*FIG. 2A*

Domain Reputation Listing — 250

| Domain | Reputation |
|---|---|
| goodsite.com | Good |
| badsite.com | Malicious |
| neutralsite.com | Unknown |
| ... | ... |

EMPLOYING SNI HOSTNAME EXTRACTION TO POPULATE A REVERSE DNS LISTING TO PROTECT AGAINST POTENTIALLY MALICIOUS DOMAINS

BACKGROUND

More and more, web traffic over the Internet is encrypted. For example, an increasing amount of web traffic is transmitted using Hypertext Transfer Protocol Secure (HTTPS), which is encrypted, instead of using Hypertext Transfer Protocol (HTTP), which is not encrypted. In addition, web traffic between client applications and Domain Name System (DNS) name servers is increasingly transmitted using a DNS over HTTPS (DoH) protocol, which is encrypted, instead of using a DNS protocol, which is not encrypted. The encryption of web traffic can provide increased privacy for parties communicating over the Internet.

One drawback with the encryption of web traffic is that filtering web traffic based on content can be difficult or impossible when the web traffic is encrypted. For example, it may be desirable to be able to monitor web traffic to DNS name servers, such as by extracting domains and IP addresses from this web traffic, and where a known or potentially malicious domain is detected in this web traffic, filtering web traffic subsequently sent to or received from the corresponding IP address to protect networks and network devices from malicious behavior at the domain. However, where web traffic to DNS name servers is encrypted, such as where this web traffic is sent using a DoH protocol, it may be difficult or impossible to extract domains corresponding IP addresses from this web traffic, thus preventing any detection of and filtering of encrypted web traffic to or from the corresponding IP addresses. Therefore, the encryption of web traffic may render content-based filtering of the web traffic difficult or impossible.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for Server Name Indication (SNI) hostname extraction to populate a reverse Domain Name System (DNS) listing to protect against potentially malicious domains may be performed, at least in part, by a router device including one or more processors. The method may include detecting a Transport Layer Security (TLS) handshake between a first client application and a first server application, extracting an SNI hostname and an Internet Protocol (IP) address from the TLS handshake, populating the reverse DNS listing with the SNI hostname as a domain paired with the IP address, detecting communication between a second client application and the IP address, accessing the reverse DNS listing to determine the domain paired with the IP address, determining that the domain is a potentially malicious domain, and in response to determining that the domain is a potentially malicious domain, performing a remedial action to protect against the potentially malicious domain.

In some embodiments, the performing of the remedial action may include one or more of blocking the communication between the second client application and the IP address, rolling back one or more changes at the second client application that were made as a result of communication with the potentially malicious domain, and disabling the second client application.

In some embodiments, the reverse DNS listing may be cached at the router device.

In some embodiments, the detecting of the communication from the second client application directed to the IP address may include detecting a TCP or UDP handshake communication from the second client application directed to the IP address.

In some embodiments, the TLS handshake may include a TLS handshake using a version of TLS earlier than TLS version 1.3.

In some embodiments, the determining that the domain is a potentially malicious domain may include determining that the domain is listed as a potentially malicious domain in a domain reputation listing.

In some embodiments, the domain reputation listing may be cached at the router device.

In some embodiments, one or more non-transitory computer-readable media may include one or more computer-readable instructions that, when executed by one or more processors of a router device, cause the router device to perform a method for SNI hostname extraction to populate a reverse DNS listing to protect against potentially malicious domains.

In some embodiments, a router device may include one or more processors and one or more non-transitory computer-readable media. The one or more non-transitory computer-readable media may include one or more computer-readable instructions that, when executed by the one or more processors, cause the router device to perform a method for SNI hostname extraction to populate a reverse DNS listing to protect against potentially malicious domains.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which:

FIG. 2A illustrates an example reverse DNS listing;

FIG. 2B illustrates an example domain reputation listing;

DETAILED DESCRIPTION

Figure 1:
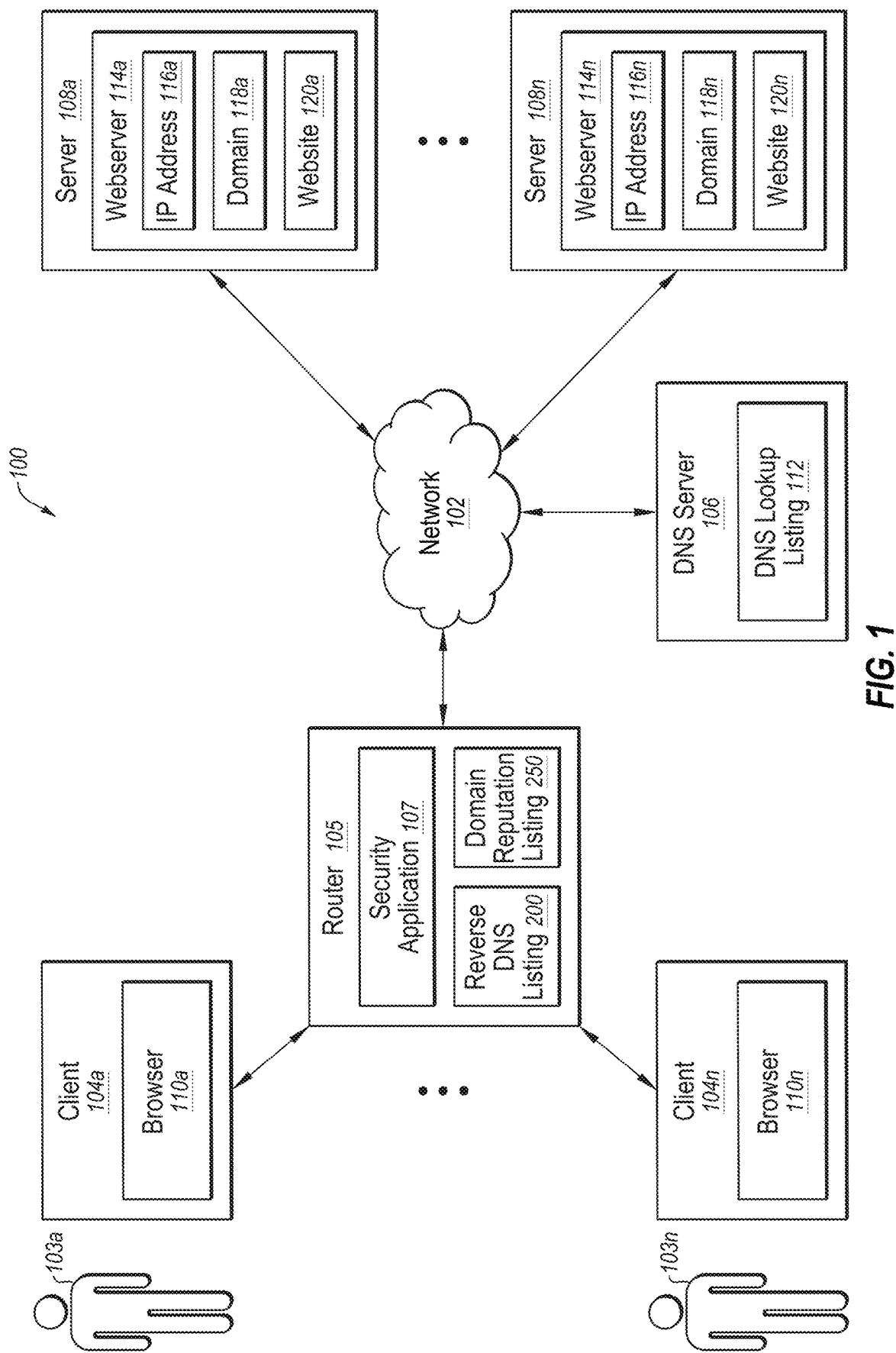
FIG. 1 illustrates an example system configured for SNI hostname extraction to populate a reverse DNS listing to protect against potentially malicious domains.

An increasing amount of web traffic is encrypted, such as by using HTTPS instead of HTTP, and using a DoH protocol instead of using a DNS protocol. While the encryption of web traffic can provide increased privacy for parties communicating over the Internet, the encryption of web traffic may make content-based filtering of web traffic difficult or impossible.

For example, it may be desirable for a router to be able to monitor web traffic to DNS name servers in order to extract domains and corresponding IP addresses from this web traffic to populate a reverse DNS listing cached at the router. The reverse DNS listing may pair IP addresses with the extracted domains. These domains listed in the reverse DNS listing may then be correlated with a domain reputation listing that pairs domains to their reputations. Where a domain is listed in the domain reputation listing as having a potentially malicious reputation, the router may employ the correlation between the reverse DNS listing and the domain reputation listing to filter web traffic between a client application and a server application at corresponding IP address, in order to protect the client application from any malicious actions that might be taken by the server application at the corresponding IP address.

However, where web traffic to DNS name servers is encrypted, such as where this web traffic is sent using a DoH protocol, it may be difficult or impossible for a router to extract domains and corresponding IP addresses from this web traffic, thus preventing the router from detecting and filtering encrypted web traffic to or from the corresponding IP addresses. Therefore, the encryption of web traffic may render content-based filtering of the web traffic difficult or impossible.

Some embodiments disclosed herein may enable Server Name Indication (SNI) hostname extraction to populate a reverse Domain Name System (DNS) listing to protect against potentially malicious domains. For example, a router may be configured to route and monitor all web traffic of a client application, such as a browser. Where the web browser is configured to communicate with DNS name servers using DoH, the router may be unable to determine with which domains the browser is in communication because the router may be unable to extract any domains, and corresponding IP addresses, from this communication over DoH. However, some embodiments disclosed herein may nevertheless allow the router to determine with which domains the browser is in communication using SNI hostname extraction. For example, after the browser has communicated over DoH with a name server to obtain an IP address for a particular domain, the browser may use attempt establish a connection to a server application at the IP address, such as a webserver, over Transmission Control Protocol (TCP) or User Datagram Protocol (UDP), which involves a TCP or UDP handshake communication. Then, once the TCP or UDP connection is established, the browser may attempt to communicate with the webserver over HTTPS, which involves a Transport Layer Security (TLS) handshake communication. Assuming the TLS handshake communication is performed using a version of TLS prior to TLS version 1.3, this TLS handshake communication will include an SNI hostname that lists the domain of the webserver, that is not encrypted, and that can be extracted by the router from the TLS handshake communication to determine the domain, and the corresponding IP address, with which the browser is in communication. Therefore, when the router detects a TLS handshake between the browser and the webserver, the router may extract the SNI hostname (e.g. domain) and the IP address of the webserver from the TLS handshake. The router may then populate a reverse DNS listing (e.g., that is cached at the router, or stored remotely, or both) with the SNI hostname as a domain paired with the IP address. Then, whenever the router detects any communication between any client application and the IP address, the router may access the reverse DNS listing to determine the domain paired with the IP address and then determine whether that the domain is a potentially malicious domain (e.g., by correlating with a domain reputation listing). If the router determines that the domain is a potentially malicious domain, the router may perform a remedial action to protect against the potentially malicious domain, such as blocking communications with the IP address of the domain (e.g., resetting TCP or UDP connections to the domain, blocking HTTPS communications with the IP address of the domain, etc.).

Therefore, using embodiments disclosed herein, even where a client application uses a DoH protocol to obtain an IP address for a domain, a router can nevertheless determine with which domains the client application is in communication using SNI hostname extraction, and can further populate a reverse DNS listing (e.g., that is cached at the router) with domains extracted using SNI hostname extraction. Further, even where an IP address uses multiple servers (e.g., in a load balancing scenario) where some of the servers use TLS version 1.3 or later, but some of the servers use a version of TLS prior to TLS version 1.3, embodiments disclosed herein may be employed by a router to nevertheless determine with which domains the client application is in communication using SNI hostname extraction from any of the servers that that use a version of TLS prior to TLS version 1.3, thus enabling population of a reverse DNS listing for the IP address going forward. These determinations and/or populations may allow a router to filter domains that are potentially malicious (e.g., domains known to or suspected of employing malware, viruses, identity theft, content harmful to children, etc.) in order to protect client applications against the potentially malicious domain.

Turning to the figures, FIG. 1 illustrates an example system 100 configured for SNI hostname extraction to populate a reverse DNS listing to protect against potentially malicious domains. The system 100 may include a network 102, clients 104a-104n, a router 105, a DNS server 106, and servers 108a-108n.

In some embodiments, the network 102 may be configured to communicatively couple the clients 104a-104n, the router 105, the DNS server 106, and the servers 108a-108n to one another and to other network devices using one or more network protocols, such as the network protocols available in connection with the World Wide Web. In some embodiments, the network 102 may be any wired or wireless network, or combination of multiple networks, configured to send and receive communications (e.g., via data packets) between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
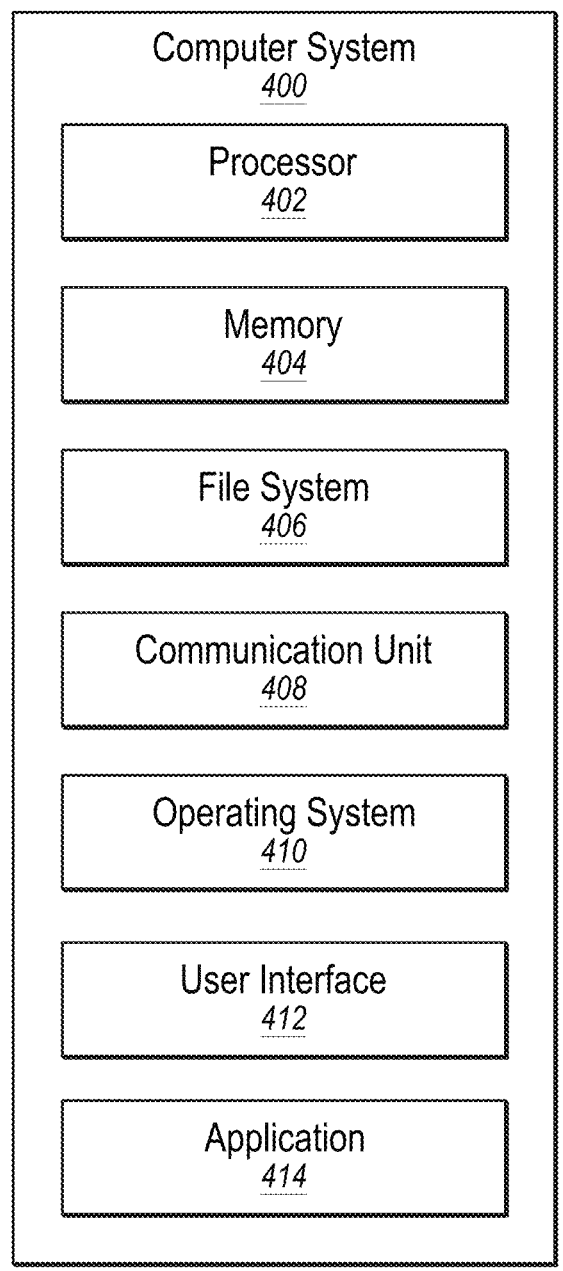
FIG. 4 illustrates an example computer system that may be employed in SNI hostname extraction to populate a reverse DNS listing to protect against potentially malicious domains.

In some embodiments, the clients 104a-104n may be any computer systems, or combination of multiple computer systems, capable of communicating over the network 102 and executing one or more client applications such as the browsers 110a-110n, examples of which are disclosed herein in connection with the computer system 400 of FIG. 4. For example, the clients 104a-104n may be employed by users 103a-103n to visit websites using the browsers 110a-110n.

In some embodiments, the DNS server 106 may be any computer system, or combination of multiple computer systems, capable of communicating over the network 102 and capable of employing a DNS lookup listing 112 to translate a domain into an IP address, examples of which are disclosed herein in connection with the computer system 400 of FIG. 4.

In some embodiments, the servers 108a-108n may each be any computer system, or combination of multiple computer systems, capable of communicating over the network 102 and capable of hosting one or more server applications such as the webservers 114a-114n, examples of which are disclosed herein in connection with the computer system 400 of FIG. 4. The webservers 114a-114n may be addressable at particular IP addresses 116a-116n on particular domains 118a-118n and may host websites 120a-120n and/or other digital content.

In some embodiments, the router 105 may be any computer system, or combination of multiple computer systems, capable of communicating over the network 102 and capable of routing network traffic between the clients 104a-104n and other network devices, such as the DNS server 106 and the servers 108a-108n. In some embodiments, the router 105 may include a security application 107 that is configured to monitor and/or filter network traffic between the clients 104a-104n and other network devices based on the domain of the other network devices. For example, the security application 107 may employ a reverse DNS listing 200 and a domain reputation listing 250 (which may be cached at the router 105 or may be stored on another network device, or both) to filter network traffic between the clients 104a-104n and any particular domain if the security application 107 determines that the domain satisfies a particular criteria for being potentially malicious, including, but not limited to, where the domain is known to be, of suspected of: being infected with malware or viruses, or engaging in identity theft, or hosting content harmful to children, etc.

Further, using embodiments disclosed herein, even where a client application of the clients 104a-104n uses a DoH protocol to obtain an IP address for a domain from the DNS lookup listing 112 of the DNS Server 106, the security application 107 can nevertheless determine with which domains the client application is in communication using SNI hostname extraction, and can further populate the reverse DNS listing 200 with domains extracted using SNI hostname extraction. This determination and/or population may allow the security application 107 to filter domains that are potentially malicious in order to protect client applications against the potentially malicious domain.

In some embodiments, the router 105 may be, or may include some or all of the functionality of, the Norton™ Core Router, made by NortonLifeLock, Inc™. Further, in some embodiments, the security application 107 may be, or may include some or all of the functionality of, the Norton™ Core software, made by NortonLifeLock, Inc™.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

FIG. 2A illustrates the example reverse DNS listing 200 of FIG. 1, and FIG. 2B illustrates the example domain reputation listing 250 of FIG. 1. As disclosed in FIG. 2A, the reverse DNS listing 200 may pair IP addresses and domains. Similarly, as disclosed in FIG. 2B, the domain reputation listing 250 may pair domains with their reputations. Although the reverse DNS listing 200 and the domain reputation listing 250 are illustrated in FIG. 1 as being cached at the router 105, it is understood that the reverse DNS listing 200 and the domain reputation listing 250 may additionally or alternatively be stored on another network device such as a server, or may be distributed across multiple network devices. Further, the reverse DNS listing 200 and the domain reputation listing 250 may be used together, such as by correlating domains listed in the reverse DNS listing 200 with domains listed in the domain reputation listing 250 to determine whether the reputation of a domain that is associated with an IP address. In this manner, the reverse DNS listing 200 and the domain reputation listing 250 may be employed to filter domains with bad or unknown reputations, for example.

Modifications, additions, or omissions may be made to the reverse DNS listing 200 and the domain reputation listing 250 without departing from the scope of the present disclosure. For example, in some embodiments, instead of only one-to-one relationships, there may be many-to-one, one-to-many, or many-to-many relationship in one or both of the reverse DNS listing 200 and the domain reputation listing 250. For example, each domain may be paired with multiple IP addresses. In another example, each domain may be paired with multiple reputations or different types or categories of reputations (e.g., risk levels, content categories, etc.). Further, instead of storing the actual domains (e.g., "goodsite.com" or "badsite.com"), a hash of each domain may be stored, which may result in more efficient use of memory and/or storage over storing actual domains. Then, when a new domain is extracted to be compared with the stored hashes of the domains, a hash of the new domain can be generated for the comparison. In this manner, a hash of each domain can be used to look up one or more IP addresses paired with the domain, or one or more reputations paired with the domain.

Figure 3A:
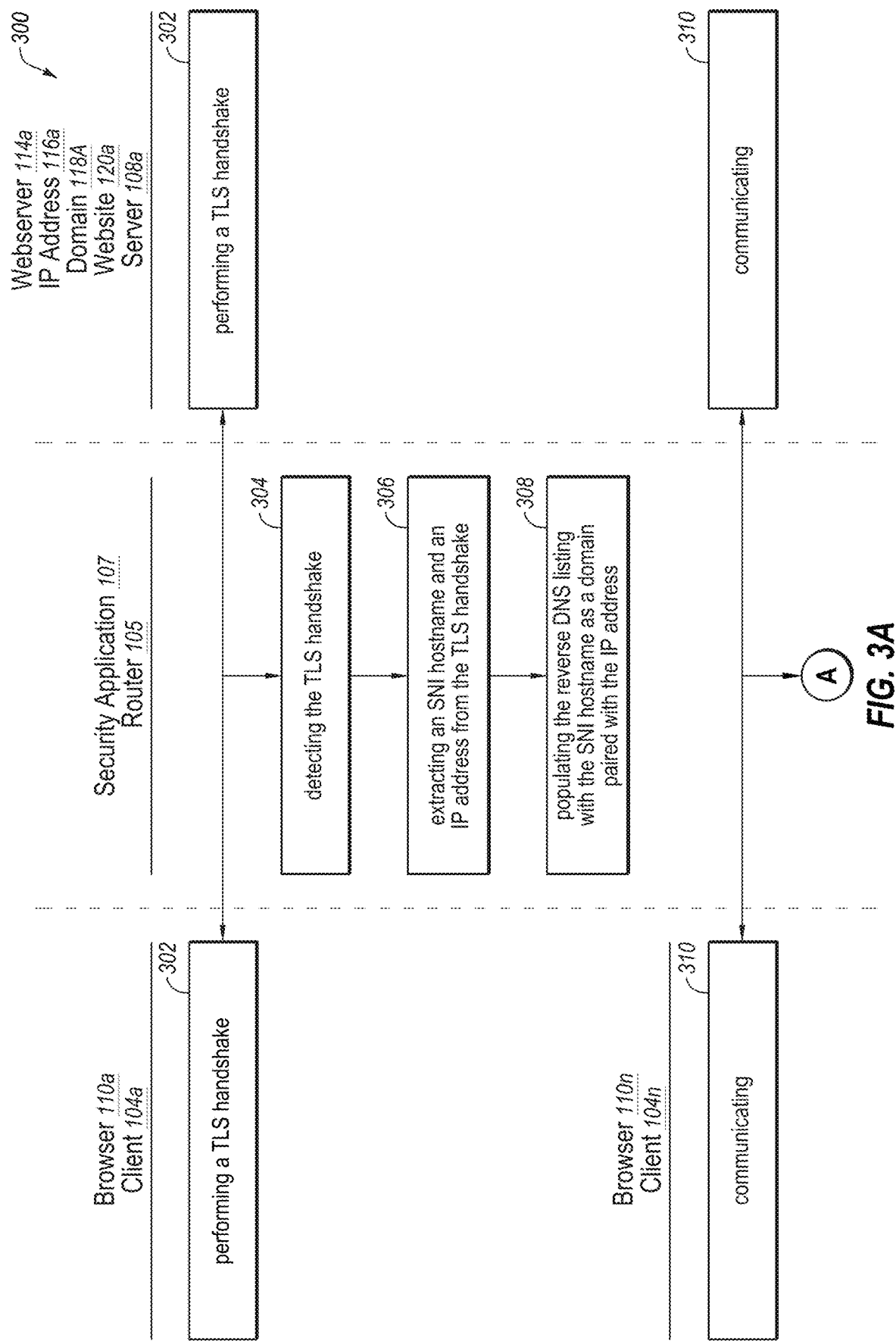
FIGS. 3A-3B are a flowchart of an example method for SNI hostname extraction to populate a reverse DNS listing to protect against potentially malicious domains.
Figure 3B:
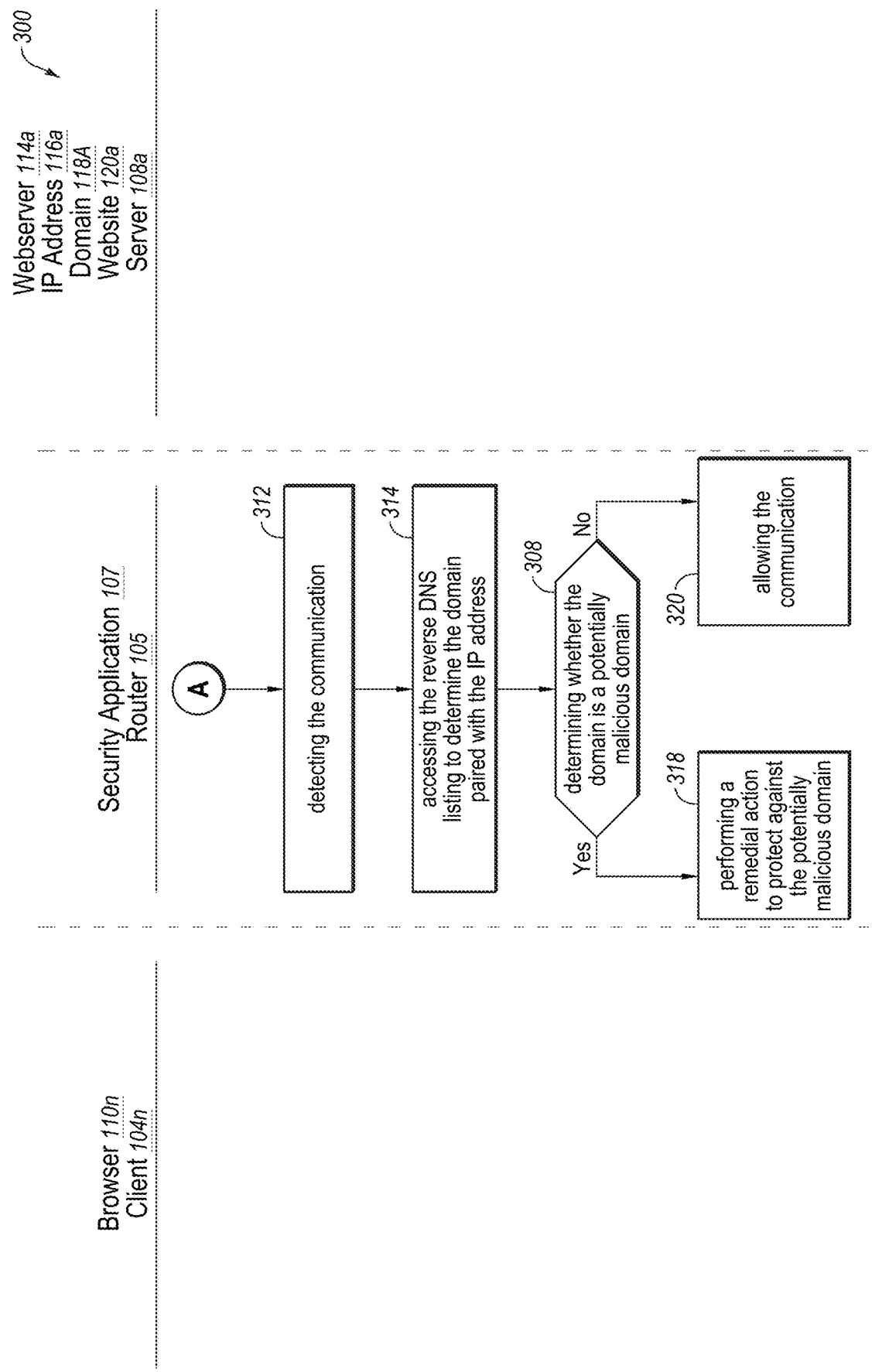

FIGS. 3A-3B are a flowchart of an example method 300 for SNI hostname extraction to populate a reverse DNS listing to protect against potentially malicious domains. The method 300 may be performed, in some embodiments, by a device or system or application, such as by the clients 104a-104n, the browsers 110a-110n, the router 105, the security application 107, the servers 108a-108n, the webservers 114a-114n, or some combination thereof. In these and other embodiments, the method 300 may be performed by one or more processors based on one or more computer-readable instructions stored on one or more non-transitory computer-readable media. The method 300 will now be described in connection with FIGS. 1, 2A, 2B, and 3A-3B.

In some embodiments, the method 300 may be performed in an environment in which the browsers 110a-110n communicate with the DNS server 106 using DoH, which may prevent the security application 107 from determining the domains with which the browsers 110a-110n are attempting to communicate. For example, the user 103a may type the domain "goodsite.com" or "badsite.com" into the browser 110a of the client 104a. Upon doing so, the browser 110a may communicate with the DNS server 106, using DoH, to determine the IP address of the domain "goodsite.com" or "badsite.com". However, because these communications are encrypted using DoH, the security application 107 of the router 105 may not be able to extract the domain or the corresponding IP address for each domain in these DoH communications.

The method 300 may include, at action 302, performing a TLS handshake. For example, the browser 110a of the client 104a and the webserver 114a of the server 108a may perform, at action 302, a TLS handshake. This TLS handshake may be performed prior to communication of web traffic between the browser 110a and the webserver 114a using HTTPS.

The method 300 may include, at action 304, detecting the TLS handshake. For example, the security application 107 of the router 105 may detect, at action 304, the TLS handshake between the browser 110a and the webserver 114a.

The method 300 may include, at action 306, extracting an SNI hostname and an IP address from the TLS handshake. In some embodiments, the TLS handshake may include a TLS handshake using a version of TLS earlier than TLS version 1.3. For example, the security application 107 of the router 105 may extract, at action 306, an SNI hostname of "goodsite.com" or "badsite.com" and an IP address of "192.135.179.123" or "157.15.27.197" from the TLS handshake. In some embodiments, the extraction of an SNI hostname from a TLS handshake is possible for all TLS handshakes that use a version of TLS earlier than TLS version 1.3.

The method 300 may include, at action 308, populating the reverse DNS listing with the SNI hostname as a domain paired with the IP address. In some embodiments, the reverse DNS listing may be cached at a router device. For example, the security application 107 of the router 105 may populate, at action 308, the reverse DNS listing 200 (which may be cached at the router 105) with the SNI hostname of "goodsite.com" or "badsite.com" as a domain paired with the IP address 116a of "192.135.179.123" or "157.15.27.197".

The method 300 may include, at action 310, communicating. For example, the browser 110n of the client 104n may communicate, at action 310, with a client application at the IP address 116a of "192.135.179.123" or "157.15.27.197".

The method 300 may include, at action 312, detecting the communication. In some embodiments, the detecting of the communication may include detecting a TCP or UDP handshake communication. For example, the security application 107 of the router 105 may detect, at action 312, the communication between the browser 110n of the client 104n and the IP address 116a of "192.135.179.123" or "157.15.27.197", with the server application, or the domain of the server application, belonging to the IP address 116a of "192.135.179.123" or "157.15.27.197" being initially unknown to the security application 107.

In some embodiments, even though the browser 110n may be communicating with an unknown server application at the IP address 116a "192.135.179.123" or "157.15.27.197" over HTTPS, the IP address 116a of the unknown server application may nevertheless be extractable by the security application 107 from the HTTPS communications because the destination IP address 116a of the HTTPS communications is not encrypted. In some embodiments, the detecting, at action 312, may occur prior to communication over HTTPS, such as by detecting a TCP or UDP handshake communication between the browser 110n of the client 104n and the IP address 116a of "192.135.179.123" or "157.15.27.197".

The method 300 may include, at action 314, accessing the reverse DNS listing to determine the domain paired with the IP address. For example, the security application 107 of the router 105 may access, at action 314, the reverse DNS listing 200 to determine the domain paired with the IP address 116a of "192.135.179.123" or "157.15.27.197", namely, the domains "goodsite.com" or "badsite.com".

The method 300 may include, at action 316, determining whether the domain is a potentially malicious domain. If so (yes at action 316), the method 300 may include, at action 318, performing a remedial action to protect against the potentially malicious domain. If not (no at action 316), the method 300 may include, at action 320, allowing the communication. In some embodiments, the performing of the remedial action may include one or more of blocking the communication between the second client application and the IP address, rolling back one or more changes at the second client application that were made as a result of communication with the potentially malicious domain, and disabling the second client application. In some embodiments, the determining that the domain is a potentially malicious domain may include determining that the domain is listed as a potentially malicious domain in a domain reputation listing. In some embodiments, the domain reputation listing may be cached at the router device.

For example, the security application 107 of the router 105 may determine, at action 316, that the domain 118a of "badsite.com" is potentially malicious by determining that the domain 118a of "badsite.com" is listed as having a malicious reputation in the domain reputation listing 250 (which may be cached at the router 105), and may perform, at action 318, a remedial action to protect against the potentially malicious domain 118a of "badsite.com". In this example, the performing of the remedial action may include blocking the communication between the browser 110n and any server application at the IP address 116a of "157.15.27.197", rolling back one or more changes at the browser 110n that were made as a result of communication with the potentially malicious domain 118a of "badsite.com", or disabling the browser 110n.

In another example, the security application 107 of the router 105 may determine, at action 316, that the domain "goodsite.com" is not malicious by determining that the domain "goodsite.com" is listed as having a good reputation in the domain reputation listing 250 (which may be cached at the router 105), and may allow, at action 320, communication between the browser 110n of the client 104n and the webserver 114a with the domain 118a of "goodsite.com" of the server 108a.

The method 300 may thus be employed, in some embodiments, to allow the router 105 to determine with which domains the browser 110a (client application) is in communication using SNI hostname extraction, even where a browser 110a uses a DoH protocol to obtain an IP address for a domain from the DNS server 106. The method 300 may also be employed by a router to populate the reverse DNS listing 200 (e.g., that may be cached at the router 105) with domains extracted using SNI hostname extraction and their corresponding IP addresses. This determination and/or population of the method 300 may allow the router 105 to filter domains that are potentially malicious (e.g., domains known to or suspected of employing malware, viruses, identity theft, content harmful to children, etc.) in order to protect the client 104a (and any other client with a client application) against the potentially malicious domain.

Although the actions of the method 300 are illustrated in FIGS. 3A-3B as discrete actions, various actions may be divided into additional actions, combined into fewer actions, reordered, expanded, or eliminated, depending on the desired implementation. For example, in some embodiments, actions 306 and 308 may be performed without performing the other actions of the method 300. In another example, in some embodiments, actions 304, 306, and 308 may be performed without performing the other actions of the method 300.

Further, it is understood that the method 300 may improve the functioning of a computer system itself and/or may improve the technical field of domain filtering. For example, the functioning of the client 104a, the client 104n, and/or the router 105 of FIG. 1 may itself be improved by the method 300 enabling the router 105 to determine with which domains a client application (e.g., the browser 110a) is in communication using SNI hostname extraction, even where the client application uses a DoH protocol to obtain an IP address for a domain from the DNS server 106. the functioning of the client 104a, the client 104n, and/or the router 105 of FIG. 1 may itself be improved by the method 300 enabling the router 105 to populate the reverse DNS listing 200 (e.g., that may be cached at the router 105) with domains extracted using SNI hostname extraction. In summary, this determination and/or population of the method 300 may allow the router 105 to filter domains that are potentially malicious (e.g., domains known to or suspected of employing malware, viruses, identity theft, content harmful to children, etc.) in order to protect the client 104a or the client 104n (or any other client with a client application) against the potentially malicious domain.

FIG. 4 illustrates an example computer system 400 that may be employed in SNI hostname extraction to populate a reverse DNS listing to protect against potentially malicious domains. In some embodiments, the computer system 400 may be part of any of the systems or devices described in this disclosure. For example, the computer system 400 may be part of any of the clients 104a-104n, the router 105, the DNS server 106, and the servers 108a-108n of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more actions of the method 300 of FIGS. 3A-3B.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more actions of the method 300 of FIGS. 3A-3B. These computer-executable instructions may be included, for example, in the operating system 410, in one or more applications, such as the browsers 110a-110n, the security application 107, or the webservers 114a-114n of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more actions of the method 300 of FIGS. 3A-3B. In some embodiments, the application 414 (e.g., app) may be part of the operating system 410 or may be part of an application of the computer system 400, or may be some combination thereof. In some embodiments, the application 414 may function as any of the browsers 110a-110n, the security application 107, or the webservers 114a-114n of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for employing Server Name Indication (SNI) hostname extraction to populate a reverse Domain Name System (DNS) listing to protect against potentially malicious domains, at least a portion of the method being performed by a router device comprising one or more processors, the computer-implemented method comprising:

monitoring, by the router device, web traffic from a first client application to a DNS name server, wherein the web traffic is encrypted using a DNS over HTTPS (DoH) protocol;

detecting, by the router device, a Transport Layer Security (TLS) handshake between the first client application and a first server application, wherein the TLS handshake comprises a TLS handshake using a version of TLS earlier than TLS version 1.3;

extracting, by the router device, an SNI hostname and an Internet Protocol (IP) address from the TLS handshake;

populating, by the router device, the reverse DNS listing with the SNI hostname as a domain paired with the IP address;

detecting, by the router device, communication between a second client application and the first server application at the IP address;

accessing, by the router device, the reverse DNS listing to determine the domain paired with the IP address;

determining, by the router device, that the domain is a potentially malicious domain; and in response to determining that the domain is a potentially malicious domain, performing, by the router device, a remedial action to protect against the potentially malicious domain.

2. The computer-implemented method of claim 1, wherein the performing of the remedial action comprises one or more of blocking the communication between the second client application and the IP address, rolling back one or more changes at the second client application that were made as a result of communication with the potentially malicious domain, and disabling the second client application.

3. The computer-implemented method of claim 1, wherein the reverse DNS listing is cached at the router device.

4. The computer-implemented method of claim 1, wherein the detecting of the communication from the second client application directed to the IP address comprises detecting a TCP or UDP handshake communication from the second client application directed to the IP address.

5. The computer-implemented method of claim 1, wherein the determining that the domain is a potentially malicious domain comprising determining that the domain is listed as a potentially malicious domain in a domain reputation listing.

6. The computer-implemented method of claim 5, wherein the domain reputation listing is cached at the router device.

7. One or more non-transitory computer-readable media comprising one or more computer readable instructions that, when executed by one or more processors of a router device, cause the router device to perform a method for employing Server Name Indication (SNI) hostname extraction to populate a reverse Domain Name System (DNS) listing to protect against potentially malicious domains, the method comprising:

monitoring, by the router device, web traffic from a first client application to a DNS name server, wherein the web traffic is encrypted using a DNS over HTTPS (DoH) protocol;

detecting, by the router device, a Transport Layer Security (TLS) handshake between the first client application and a first server application, wherein the TLS handshake comprises a TLS handshake using a version of TLS earlier than TLS version 1.3;

extracting, by the router device, an SNI hostname and an Internet Protocol (IP) address from the TLS handshake;

populating, by the router device, the reverse DNS listing with the SNI hostname as a domain paired with the IP address;

detecting, by the router device, communication between a second client application and the first server application at the IP address;

accessing, by the router device, the reverse DNS listing to determine the domain paired with the IP address;

determining, by the router device, that the domain is a potentially malicious domain; and in response to determining that the domain is a potentially malicious domain, performing, by the router device, a remedial action to protect against the potentially malicious domain.

8. The one or more non-transitory computer-readable media of claim 7, wherein the performing of the remedial action comprises one or more of blocking the communication between the second client application and the IP address, rolling back one or more changes at the second client application that were made as a result of communication with the potentially malicious domain, and disabling the second client application.

9. The one or more non-transitory computer-readable media of claim 7, wherein the reverse DNS listing is cached at the router device.

10. The one or more non-transitory computer-readable media of claim 7, wherein the detecting of the communication from the second client application directed to the IP address comprises detecting a TCP or UDP handshake communication from the second client application directed to the IP address.

11. The one or more non-transitory computer-readable media of claim 7, wherein the determining that the domain is a potentially malicious domain comprising determining that the domain is listed as a potentially malicious domain in a domain reputation listing.

12. The one or more non-transitory computer-readable media of claim 11, wherein the domain reputation listing is cached at the router device.

13. A router device comprising:

one or more processors; and one or more non-transitory computer-readable media comprising one or more computer readable instructions that, when executed by the one or more processors, cause the router device to perform a method for employing Server Name Indication (SNI) hostname extraction to populate a reverse Domain Name System (DNS) listing to protect against potentially malicious domains, the method comprising:

monitoring, by the router device, web traffic from a first client application to a DNS name server, wherein the web traffic is encrypted using a DNS over HTTPS (DoH) protocol;

detecting, by the router device, a Transport Layer Security (TLS) handshake between the first client application and a first server application, wherein the TLS handshake comprises a TLS handshake using a version of TLS earlier than TLS version 1.3;

extracting, by the router device, an SNI hostname and an Internet Protocol (IP) address from the TLS handshake;

populating, by the router device, the reverse DNS listing with the SNI hostname as a domain paired with the IP address;

detecting, by the router device, communication between a second client application and the first server application at the IP address;

accessing, by the router device, the reverse DNS listing to determine the domain paired with the IP address;

determining, by the router device, that the domain is a potentially malicious domain; and in response to determining that the domain is a potentially malicious domain, performing, by the router device, a remedial action to protect against the potentially malicious domain.

14. The router device of claim 13, wherein the performing of the remedial action comprises one or more of blocking the communication between the second client application and the IP address, rolling back one or more changes at the second client application that were made as a result of communication with the potentially malicious domain, and disabling the second client application.

15. The router device of claim 13, wherein the reverse DNS listing is cached at the router device.

16. The router device of claim 13, wherein the detecting of the communication from the second client application directed to the IP address comprises detecting a TCP or UDP handshake communication from the second client application directed to the IP address.

17. The router device of claim 13, wherein the determining that the domain is a potentially malicious domain comprising determining that the domain is listed as a potentially malicious domain in a domain reputation listing that is cached at the router device.

* * * * *